(12) United States Patent
Daily et al.

(10) Patent No.: US 9,990,509 B2
(45) Date of Patent: Jun. 5, 2018

(54) SYSTEMS AND METHODS FOR ERROR DETECTION AND DIAGNOSTICS VISUALIZATION

(71) Applicant: ROCKWELL AUTOMATION TECHNOLOGIES, INC., Mayfield Heights, OH (US)

(72) Inventors: Gordon Daily, Solon, OH (US); Kevin Carl Smith, Franklin, WI (US); Matthew R. Ericsson, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1246 days.

(21) Appl. No.: 13/664,305

(22) Filed: Oct. 30, 2012

(65) Prior Publication Data

US 2013/0123951 A1  May 16, 2013

Related U.S. Application Data

(60) Provisional application No. 61/558,985, filed on Nov. 11, 2011.

(51) Int. Cl.
*G05B 15/02* (2006.01)
*G06F 21/62* (2013.01)
*G06F 21/30* (2013.01)
*G05B 23/02* (2006.01)
*G05B 19/042* (2006.01)
*G09G 5/00* (2006.01)

(52) U.S. Cl.
CPC ....... *G06F 21/6218* (2013.01); *G05B 19/042* (2013.01); *G05B 23/0216* (2013.01); *G06F 21/30* (2013.01); *G05B 2219/23121* (2013.01); *G05B 2219/23171* (2013.01); *G05B 2219/23258* (2013.01); *G05B 2219/24093* (2013.01); *G09G 5/00* (2013.01); *G09G 2340/14* (2013.01)

(58) Field of Classification Search
USPC .......................................................... 700/79
See application file for complete search history.

(56) References Cited

U.S. PATENT DOCUMENTS

2011/0178977 A1* 7/2011 Drees .................... G05B 15/02
706/52

* cited by examiner

*Primary Examiner* — John Park
(74) *Attorney, Agent, or Firm* — Fletcher Yoder, P.C.

(57) ABSTRACT

A human machine interface (HMI) configured to provide visualizations of one or more device elements that correspond to one or more components in an industrial automation system on an HMI screen. The HMI includes computer-executable instructions stored on a tangible machine-readable medium configured to determine whether at least one of the device elements is associated with an error and modify at least one graphic that corresponds to the at least one of the device elements when the one of the device elements is associated with the error.

23 Claims, 12 Drawing Sheets

SYSTEMS AND METHODS FOR ERROR DETECTION AND DIAGNOSTICS VISUALIZATION

CROSS REFERENCE TO RELATED APPLICATIONS

This application is a Non-Provisional of U.S. Provisional Patent Application No. 61/558,985, entitled "Visualization Software Platform and Terminal", filed Nov. 11, 2011, which is herein incorporated by reference.

BACKGROUND

Embodiments of the present disclosure relate generally to the field of industrial automation systems. More particularly, embodiments of the present disclosure relate to methods for visualizing detected errors and diagnostics in the field of industrial automation systems.

Industrial automation systems are managed and operated using automation control and monitoring systems. A wide range of applications exist for automation control and monitoring systems, particularly in industrial automation settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. HMIs may be employed in numerous different settings, such as in automobiles, aircraft, commercial settings, and a host of other applications. The HMIs may read from or write to specific registers such that they can reflect the operating state of various machines, sensors, processes, and so forth. As such, the HMIs may display valuable information on HMI screens such that operators can sufficiently manage the industrial automation system.

Conventional methods for depicting errors on HMI screens include displaying empty graphical fields on the HMI screens. The empty graphical fields may result when data objects that correspond to the graphical fields are empty, corrupt, inaccessible, or invalid. As such, the empty graphical fields may generally indicate that an error exists with the corresponding data objects. Alternatively, errors may be depicted in the HMI screens via a text box that shows free-running text of each error as they occur. In some traditional systems, these errors are also recorded in a historical error log that describes each error and provides a time stamp that indicates when the corresponding error occurred. These conventional methods for depicting errors may indicate to an HMI user that an error exists within the industrial automation system. However, it is now recognized that certain traditional systems may provide the HMI user with incorrect information (i.e., misinformation), provide inadequate annunciation, provide inefficient means for interpreting and resolving errors, and so forth. Accordingly, improved systems and methods for error detection and visualization are desirable.

BRIEF DESCRIPTION

In one embodiment, the present disclosure relates to a system that may include a human machine interface (HMI) configured to visualize one or more device elements that correspond to one or more components in an industrial automation system on an HMI screen. The HMI may include computer-executable instructions stored on a tangible machine-readable medium configured to determine whether at least one of the device elements is associated with an error and modify at least one graphic that corresponds to the at least one of the device elements when the one of the device elements is associated with the error.

In another embodiment, the present disclosure related to a method for providing a visualization of one or more errors for one or more components in an industrial automation system. As such, the method may include receiving, using a human machine interface (HMI), an indication that one or more device elements that correspond to the one or more components is associated with at least one error. The method may then include modifying at least one graphic that corresponds to the one or more device elements associated with the at least one error.

In yet another embodiment, the present disclosure relates to a tangible, non-transitory, computer-readable medium that may include machine-readable instructions to receive a plurality of errors that corresponds to a plurality of device elements for depiction in visualizations on a screen of a human machine interface (HMI). Here, the plurality of device elements may correspond to a plurality of components in an industrial automation system, and the HMI may be configured to monitor and control the plurality of components. The machine-readable instructions may then identify one or more subsets of the plurality of errors such that each of the one or more subsets may include at least two of the plurality of errors and the at least two of the plurality of errors may be related. The machine-readable instructions may then classify the one or more subsets as one or more categories of errors and request display of an indication of the categories of errors.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is generally directed towards providing a visualization including detected errors on human-machine interface (HMI) screens used to manage various types of equipment, components, and processes in industrial automation systems. A number of errors may be depicted on displays or screens of the HMIs including configuration errors (e.g., syntax, incorrectly linked tag) for an application running on or utilizing the HMIs, system fault conditions (e.g., device failure) present on components within the industrial automation system, alarm/warning conditions (e.g., annunciation conditions) for components within the industrial automation system, and the like. Present embodiments of the disclosure are directed to visualizing these types of detected errors on an HMI screen such that the errors may be depicted in a consistent manner with in-context detail. That is, each depicted error may provide information in context with or related to the actual error. Moreover, various methods described herein may be employed to determine how and when these errors are visualized on the HMI screens such that an HMI user may efficiently understand and resolve the causes of these errors. Additional details regarding the visualization of detected errors on HMI screens will be described below with reference to FIGS. 1-15.

Figure 1:
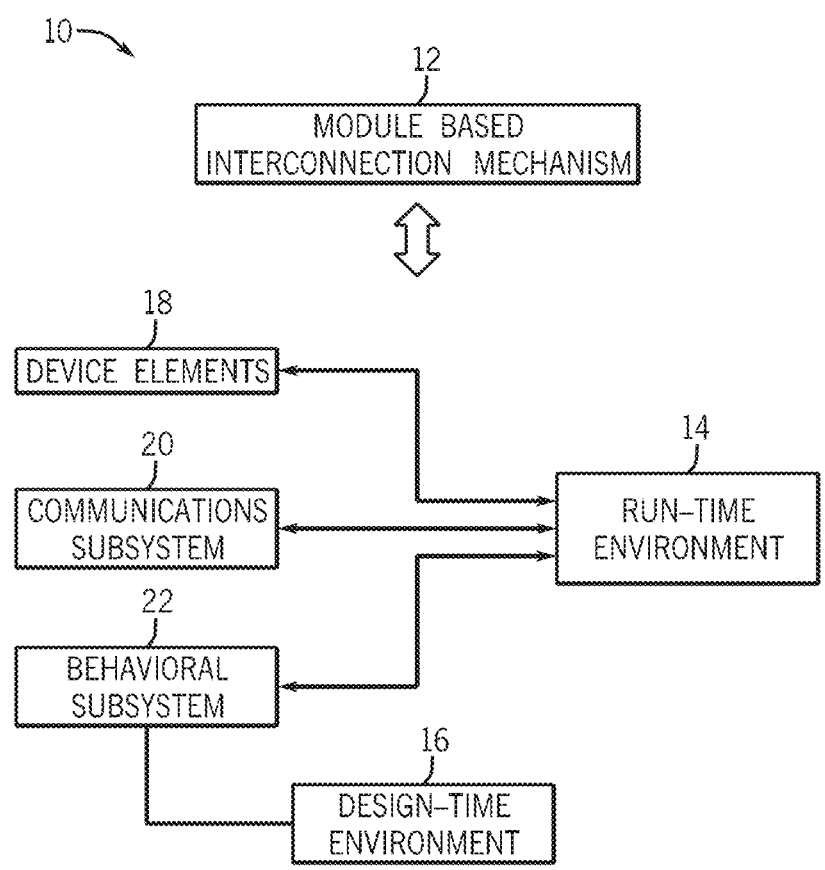
FIG. 1 is a block diagram of a framework for portions of an automation control and monitoring system for an industrial automation system, in accordance with an embodiment.

By way of introduction, FIG. 1 is a diagrammatical representation of a control and monitoring software framework 10 for an HMI of an industrial automation system. The framework 10 facilitates building functional software for the HMI by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements are provided as stand-alone code that can be individually programmed, pre-written for use, as in a library, customized in their function and appearance in HMI screens, and interconnected to various components within an industrial automation system to provide information to a user as well as control and monitoring functions.

The framework 10 includes two interrelated software environments that can reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or HMI screen). Further, the system may include an input device (e.g., a keypad) for accepting operator input that can be detected and managed via the run-time environment 14.

The run-time environment 14 includes or provides access to device elements 18. The device elements 18 are software components that may include any accessible or configurable element in a software environment. For example, the device elements 18 include software components, such as "ActiveX" controls, ".NET" components, and "Extensible Markup Language" (XML) components that are managed by the run-time environment 14. "ActiveX" and ".NET" refer to object-oriented concepts, technologies and tools. Those skilled in the art will be well acquainted with such programming approaches generally. In the present context, such standards should be taken as merely examples, and "device elements" should be understood as including any generally similar components or self-sufficient programs that can be run as quasi-independent elements.

Specific examples of device elements 18 may include software pushbuttons, timers, gauges, PLC communication servers, visualizations (such as graphics that illustrate state of components within the automation control and monitoring system), and applications. In general, virtually any identifiable function may be configured as such an element. Moreover, as discussed below, such elements may communicate with one another to perform a wide range of display, monitoring operations, and control functions. It should be noted that the device elements 18 do not require special limitations for supporting a design mode. Also, while elements associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 18. In practice, the communications subsystem 20 may be thought of as including the connections of the device elements 18. However, it may include a range of software, hardware and firmware that send data to and receive data from external circuits, such as automation controllers, other computers, networks, satellites, sensors, actuators, and so forth.

The design-time environment 16 includes an advanced implementation of the behavioral subsystem 22 that facilitates direct or indirect manipulation of the run-time environment 14, without impeding or compromising the behavior of the run-time environment 16. That is, design and reconfiguration of the device elements 18 can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Figure 2:
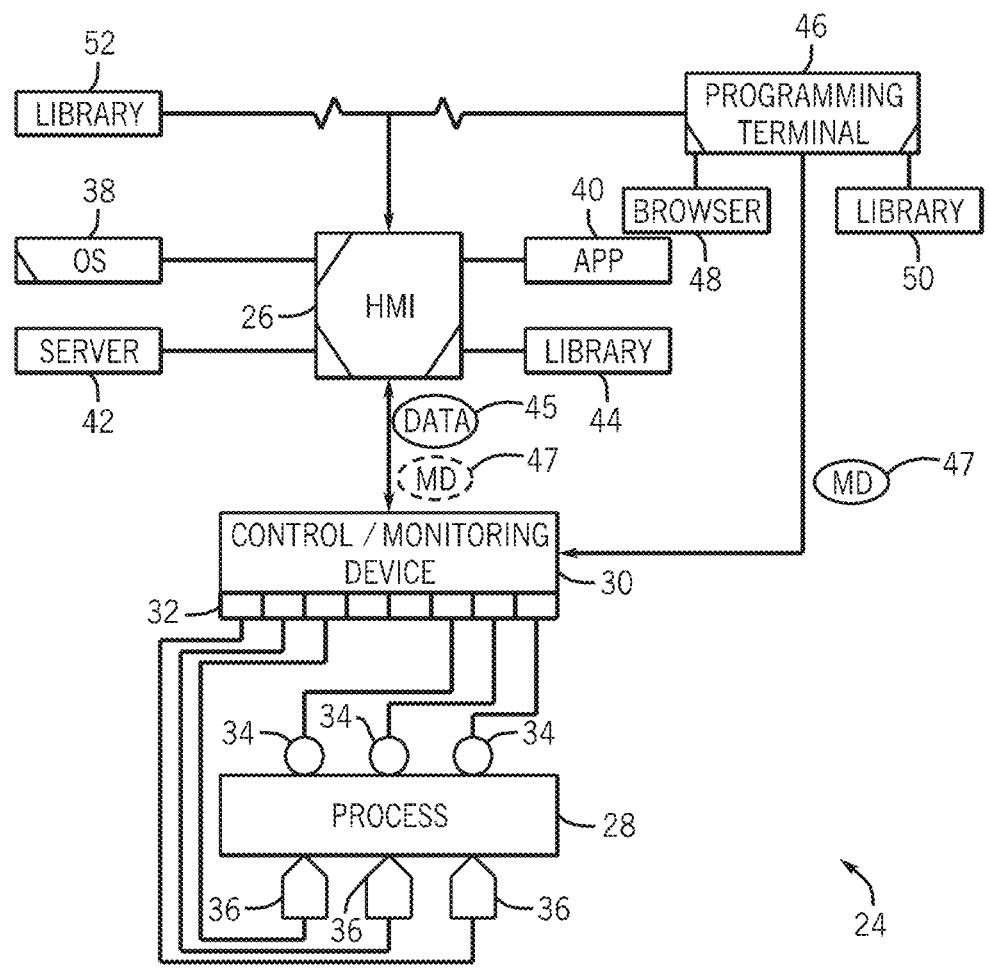
FIG. 2 is a block diagram of the automation control and monitoring system of FIG. 1, in accordance with an embodiment.

FIG. 2 is a diagrammatical representation of a control and monitoring system 24, such as for industrial automation systems, implementing the framework described above in accordance with an embodiment of the present disclosure. The system 24 includes an HMI 26 adapted to interface with networked components and configuration equipment. The system 24 is illustrated as including an HMI 26 adapted to collaborate with components of a process 28 through a control/monitoring device 30 (e.g., a remote computer, automation controller, such as a programmable logic controller (PLC), or other controller).

Collaboration between the HMI 26 and components of the process 28 may be facilitated by the use of any suitable network strategies. While reference is made in the present discussion to networked systems and to systems incorporating controllers and other equipment, the HMI 26 and programming techniques described may be equally well applied to non-networked components (e.g., GPS displays, game displays, cell phone displays, tablet displays, etc.) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create graphics and locate user interface device elements (actual images or pictorial representations corresponding to the elements) to be displayed on an HMI screen. These applications, graphics, and user interface elements are each types of device elements 18. As described below, the HMI 26 includes a stored application that dictates the layout and interaction of the device elements 18.

The HMI 26 may be adapted to allow a user to interact with virtually any process. For example, the process 28 may comprise a compressor station, an oil refinery, a batch operation for making food items, a mechanized assembly line, and so forth. Accordingly, the process 28 may comprise a variety of operational components, such as electric motors, valves, temperature sensors, pressure sensors, or a myriad of manufacturing, processing, material handling and other applications. Further, the process 28 may comprise control and monitoring equipment for regulating process variables through automation and/or observation. In general, the process 28 may comprise sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The control/monitoring device 30 may be configured to store measurement data acquired from the sensors 34 in an addressable register 32 of onboard memory. Such measurement data may be stored in a manner defined by a rigid data structure, as described in detail below. In some embodiments, the sensors 34 and actuators 36 may be in direct communication with the HMI 26, such that the measurement data acquired from the sensors 34 is stored in a memory of the HMI 26 as defined by the measurement data structure.

The HMI 26, through the programming of the device elements 18 as described below, may be thought of as including instructions for presenting one or more screen views or visualizations of the device elements 18 to be depicted on the HMI screen (e.g., pressing a button, touching a location of a screen, and the like). The instructions may be performed by any type of non-transitory computer-readable medium. In certain embodiments, the screen views and device elements 18 may be visualized or depicted on the HMI screen by an operating system 38. As such, the operating system 38 and the device elements 18 may facilitate dynamic configuration of the HMI 26 through a browser 48 by allowing configuration access (e.g., serving up) to the browser 48.

In addition to the operating system 38 and the device elements 18 as described above, the HMI 26 includes an application or application layer 40. The application 40, which may itself comprise a device element, facilitates access to and acquisition of information from the various device elements 18 depicted on the HMI screen.

The screen views and device elements may be described as independent executable pieces of software. In a present embodiment, the screen views are defined by appropriate code written in a markup language (e.g., Hypertext Markup Language or HTML). Thus, the configuration of graphical interface screens (HMI screen) for the HMI 26 may be performed without the use of conversion programs. Further, by programming of the device elements 14, the screen views may be developed directly on the HMI 26 via resident server software (designated as server 42) that makes the resident development environment available for remote access. Specifically, in one embodiment, representations of the device elements 14 may be served up to the browser 48 without serving up the software components themselves.

As noted above, the device elements 18 may include functionality by which they read from or write to specific memory or registers of memory, typically in other devices (but which could also be within the HMI 26). For example, a particular function may correspond to writing to or reading from one of the addressable registers 32 of the control/monitoring device 30. In a simple case, for example, an object accesses a piece of data (e.g., a state of a component as determined by one of the sensors 34), and generates an output signal to write a value corresponding to the state of a different networked device.

In presently contemplated embodiments, the device elements 18 may access the measurement data 45 obtained from the sensors 34. It may be desirable for these objects to also access metadata 47 relating to the measurement data 45. The term "metadata" 47 may refer to data that is external to, or not part of, the device element 18 with which it is associated. That is, the metadata 47 may be associated with the measurement data 45 without being stored in the measurement data structure. While the measurement data 45 may include live data values detected via one or more of the sensors 34, the corresponding metadata 47 may represent additional information about the measurement data 45 to which it is applied. For example, the metadata 47 may include data representative of a default value, a minimum value, a maximum value, or units of the measurement data 45. The metadata 47 thus provides context for interpreting the measurement data 45 used in the control/monitoring device 30. In certain embodiments, the metadata 47 may be stored in an onboard memory (e.g., registers 32) of the control/monitoring device 30 and there dynamically associated with the measurement data 45. The HMI 26 may use the metadata 47 for displaying visualizations, logging historical values of the measurement data 45, and various other functions.

In an industrial control and monitoring context, the device elements 18 may indicate data related to a range of physical components, such as a tank, a gauge, a flow meter, and the like. Many pre-programmed device elements may be available for use by the HMI 26. Such device elements may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements 18 may reside on the HMI 26 to facilitate configuration of the HMI 26. The device elements 18 available from the library 44 may include different types representative of types of objects operated by the control/monitoring device 30. In some embodiments, such types stored in the library 44 may include metadata 47 that is generally consistent across the instances of that particular type of object.

Once the device elements 18 then resident on the HMI 26 are accessible to the programming terminal 46, aspects of the HMI 26 can be modified or updated directly on the HMI 26 via the communication link from the programming terminal 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements 18 via the programming terminal 46 and use them to modify the HMI graphic or functionality in a development environment.

It should be noted that additional device elements 18 can be added to the library 44. For example, if a trending device element 18 is not resident on the HMI 26, a user can download such an element to the HMI 26 from a configuration library 50 resident on the programming terminal 46. Alternatively, a user could access the trending device element 18 from a resource library 52 accessible via a network (e.g., the Internet), either directly to the HMI 26 or through the programming terminal 46. This may be particularly beneficial because new and improved device elements 18 can be downloaded to the HMI 26 individually and on a periodic basis, thus adding new functionality without necessitating the periodic release of new conversion programs or HMI operating systems, or run-time or design-time environment software. The development environment may provide links to such libraries.

Figure 3:
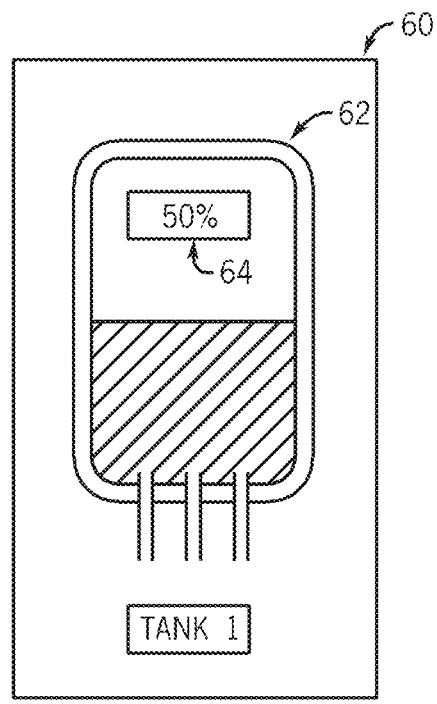
FIGS. 3-9 are visualizations depicted on a human-machine interface (HMI) screen of the automation control and monitoring system of FIG. 1, in accordance with an embodiment.
Figure 4:
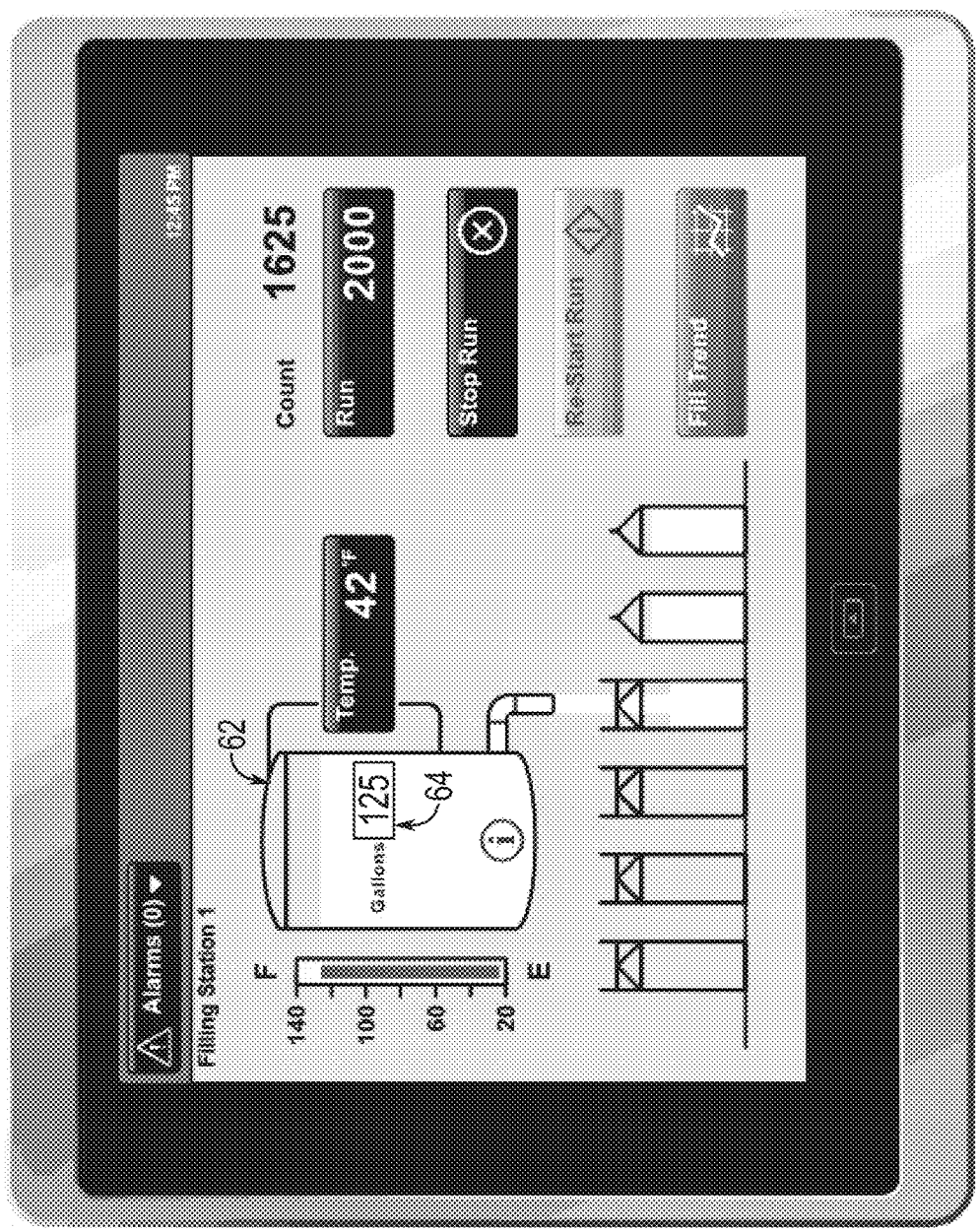

In certain embodiments, various device elements 18 may be programmed to be depicted as visualization on an HMI screen. For instance, FIG. 3 illustrates a block diagram of an HMI screen 60 that may be displayed on the HMI 26 and that includes a graphic depicting a tank 62 along with a data field 64. The tank 62 may be one of the device elements 18 described above and may represent a physical container present in an industrial automation environment (e.g., chemical plant). For reference, FIG. 4 provides an example of a screen shot of an HMI display that may correspond to the HMI screen 60 of FIG. 3.

Referring back to FIG. 3, the tank 62 is depicted as being half-full by coloring half of the tank 62 to resemble a half-full tank. Moreover, the fill level of the tank 62 may also be indicated in a data field 64, which may retrieve the value stored in the memory location, as defined by the metadata 47 of the corresponding data element 18. As such, the data field 64 indicates that the tank 62 is 50% full. In certain embodiments, the tank 62 and the data field 64 may be specified or designed by a user in the design-time environment 16 such that an HMI user may view the current level of the tank 62 on the HMI screen 60.

Keeping the foregoing in mind, if the memory location that corresponds to the tank 62 and the data field 64 is corrupt, invalid, or is no longer available, the control/monitoring device 30 may not retrieve any data. As a result, in conventional systems, the tank 62 may be depicted as being empty and the data field 64 may indicate that the tank 62 is 0% full. In this case, an HMI user (i.e., operator of the HMI 26) may believe that the tank 62 is 0% full when it is actually 50% full. This misinformation may cause the HMI user to believe that there is something wrong with the physical tank that is being represented by the tank 62 or any other physical component that may be coupled to the physical tank represented by the tank 62. As such, the operator may waste valuable trouble shooting time by verifying the physical components in the industrial automation system when the error may actually be due to a software component in the software of the control and monitoring framework 10 (e.g., run-time environment 14).

Figure 5:
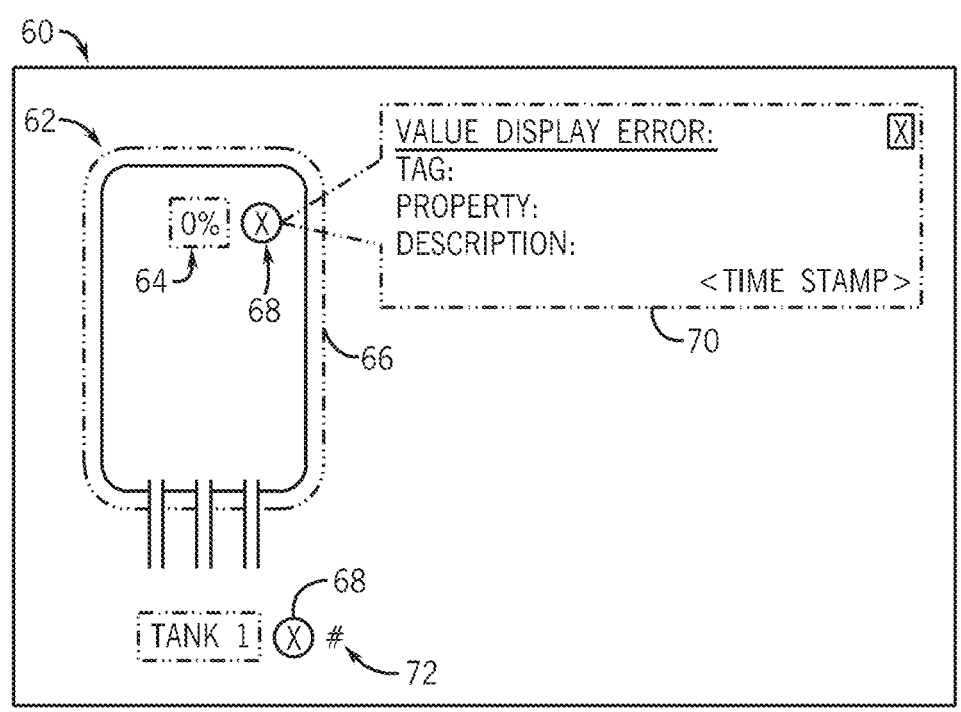

To more efficiently identify and correct for errors that occur in the industrial automation system or in the control and monitoring framework 10, the HMI 26 may consistently represent device elements 14 that have an error associated with them using a modified graphic in accordance with present techniques. That is, when the HMI 26 determines or receives an indication that a device element 18 displayed on the HMI screen 60 has an error, the HMI 26 may alter the displayed graphic that represents the erroneous device element 18. For instance, the HMI 26 may modify an outline 66 of the graphic for the tank 62 as shown in FIG. 5. That is, the outline 66 of tank 62 in FIG. 5 may be modified to display a pattern instead of a solid line to indicate that the device element 18 (tank 62) is in an error state. In certain embodiments, the outline 66 may be changed to a different color (e.g., red) or highlighted when an error is detected. Referring back to the example described above, if the HMI user notices a modified outline 66 around the data field 64 and the tank 62, the HMI user may immediately realize that the data being display is likely erroneous and thus begin trying to resolve the problem associated with the error, instead of mistakenly acting in response to the erroneous 0% reading of the data field 64.

In the same manner, the HMI 26 may consistently represent animated device elements 14 that have an error associated with them using a modified graphic in accordance with present techniques. That is, when the HMI 26 determines or receives an indication that an animated device element 18 that may be in motion on the HMI screen 60 has an error, the HMI 26 may alter the displayed animation graphic that represents the erroneous device element 18, as described above. In certain embodiments, the HMI 26 may freeze the animation of the device element 18 such that it is no longer animated. As such, if the HMI user notices a frozen device element 18 when the device element 18 is expected to be animated, the HMI user may immediately realize that the data being display in the frozen device element 18 is likely erroneous and thus begin trying to resolve the problem associated with the error. Any value displayed in the frozen device element 18 may correspond to a value displayed at the time of the error detection.

Although the graphic modifications described above may be implemented to denote erroneous device elements 18, it should be noted that in some embodiments, the HMI user or designer may define how the graphics that correspond to the erroneous device elements 18 may be depicted. For instance, the HMI user may define an error state set that may indicate to the HMI 26 how to modify the graphics that correspond to the erroneous device elements 18. In this manner, the HMI designer, who may better understand how errors may best be depicted, may define the error state set in the design-time environment 16 such that it best serves the HMI user. For example, the error state set may specify that a graphic that corresponds to an erroneous device element 18 may be removed, filled with a cross-hatch graphic, may be disabled (i.e., un-interactive), and so forth. By allowing the HMI designer to define the error state, the HMI 26 may allow for a customizable error display.

In any case, the HMI 26 may modify the erroneous device elements 18 displayed on the HMI 26 in a consistent manner such that a viewer of the HMI screen 60 would be able to quickly recognize that the modified graphic of device element 18 had an error. Moreover, given the limited screen space in the HMI screen 60, by modifying the already existing graphics as opposed to adding additional graphics to indicate that device elements 14 may be in an error state, the HMI 26 may make more efficient use of its valuable screen space.

Figure 6:
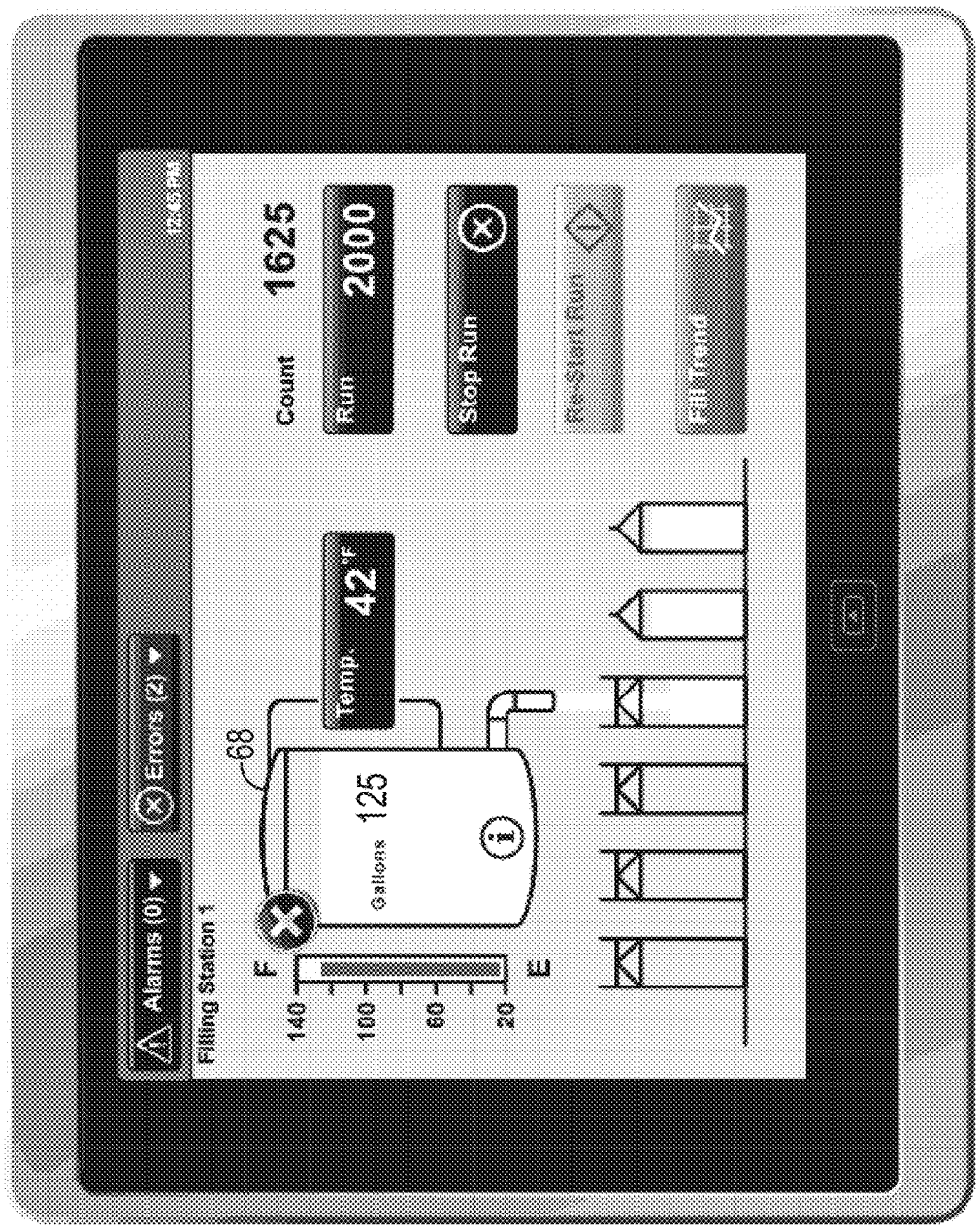

However, in certain embodiments, in addition to or in view of modifying the outline or animation of the erroneous device element 18 (e.g., tank 62), the HMI 26 may place an error icon 68 over the erroneous device element 18 (e.g., tank 62) to indicate the error state of the tank 62. In general, the error icon 68 may be designed to quickly make the HMI user aware of any errors depicted on the HMI screen 60. As shown in FIG. 6, the error icon 68 may be a circle that contains an "X" within it. In any case, the error icon 68 may be designed such that it is large enough to be noticeable by an HMI user while being small enough to allow the HMI user to continue to view the remaining portions of the HMI 26. In some embodiments, the error icon 68 may be designed by the HMI user in the design-time environment 16. For reference, FIG. 6 provides an example of a screen shot of an HMI display that includes the error icon 68 described above.

As mentioned above, the error icon 68 may provide a general indication that an error is present with respect to the device element 18 on which the error icon 68 is placed. However, in some embodiments, a different error icon 68 (i.e., graphic or image) may be placed on the erroneous device element 18 based on the type of error that exists on the device elements. For instance, a number of errors may be depicted on the HMI 26 including configuration errors (e.g., syntax, incorrectly linked tag) for an application running on the HMIs, system fault conditions (e.g., device failure) present in the industrial automation system, annunciation conditions (e.g., anticipated alarm), and the like. Generally, configuration errors may relate to items that may have been created in the design-time environment. System fault conditions may relate the failure of physical devices that require a person or personnel to resolve the conditions at locations where the physical devices may reside. Annunciation conditions may include expected alarms or alarms that have been preconfigured to indicate a particular situation to the HMI user. A different personnel group may typically resolve each type of error. As such, in one embodiment, the error icon 68 may be different for each type of error. In certain cases, the HMI user may define the shape or graphic for each type of error in the design-time environment 16. By way of examples, the configuration error may be depicted with a circle having an "X" disposed within it, the system fault condition may be depicted with a triangle having an exclamation point ("!") disposed within it, and the annunciation condition may be depicted as an image of a bell. In this manner, the HMI user may more quickly determine the nature of the error and contact the appropriate personnel to resolve the error after quickly glancing at the HMI screen 60.

Figure 7:
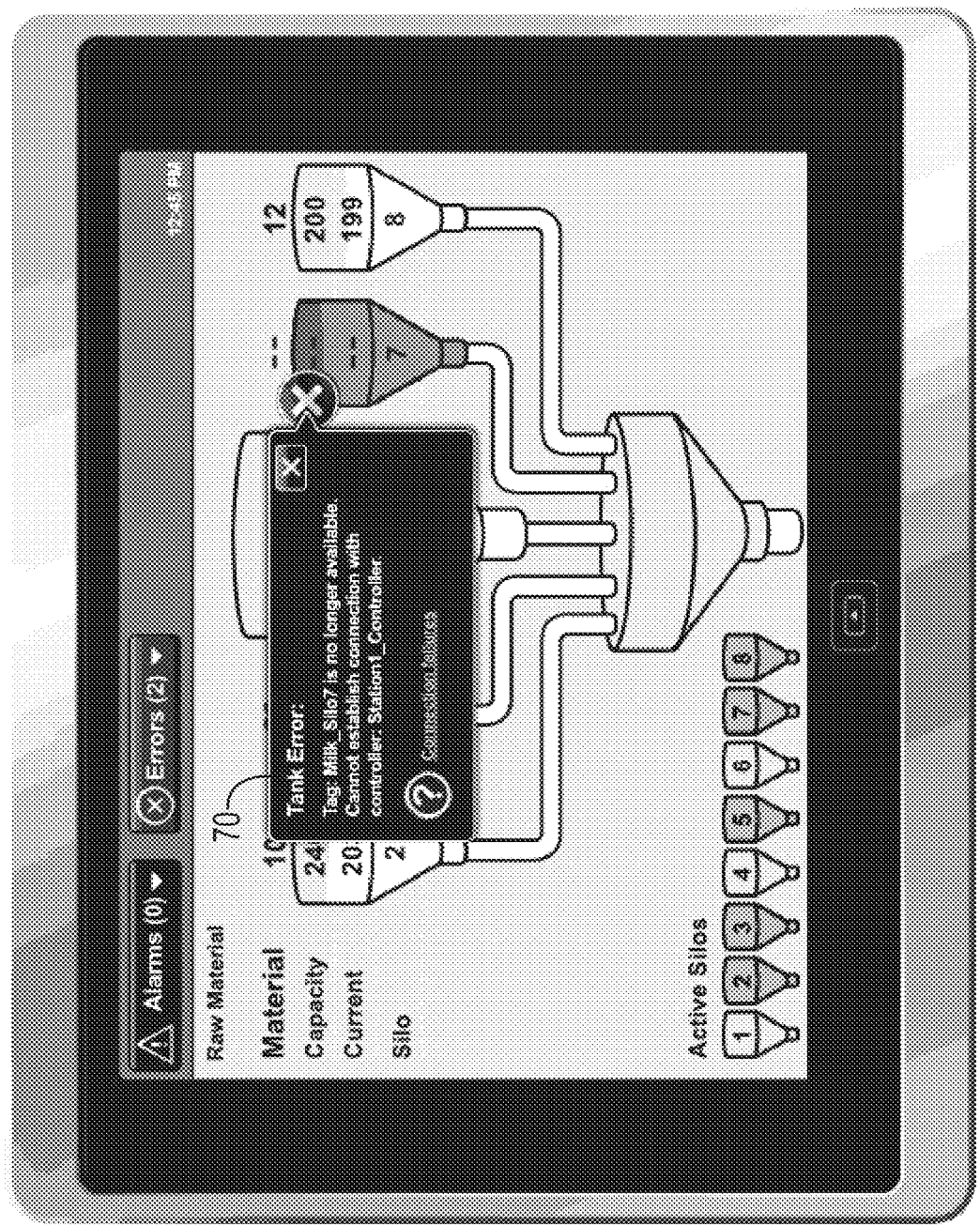

Referring back to the error icon 68 provided in FIG. 5, in some embodiments, the error icon 68 may also receive an input to provide additional information that is in-context with the particular error that corresponds to the device element 18. For instance, after receiving an input on the error icon 68, the HMI 26 may display an error window 70 to provide in context detail of the particular error that corresponds to the device element 18. In one embodiment, the graphic corresponding to the error icon 68 may be modified even further by shading or the like when the error icon 68 receives the input. Additional details with regard to the error window 70 will be discussed below with reference to FIG. 13. For reference, FIG. 7 provides an example of a screen shot of an HMI display that may depict the error window 70, which will be discussed in greater detail below with reference to FIG. 13.

Referring briefly back to FIG. 5, in some embodiments, a number of different errors may be related one device element 18. In this case, instead of placing a number of error icons 68 on top of each other, around the device element 18, or covering other parts of the HMI screen 60, the HMI 26 may add a numeric count 72 next to the error icon 68 to indicate the number of errors that are related to the device element 18.

Figure 8:
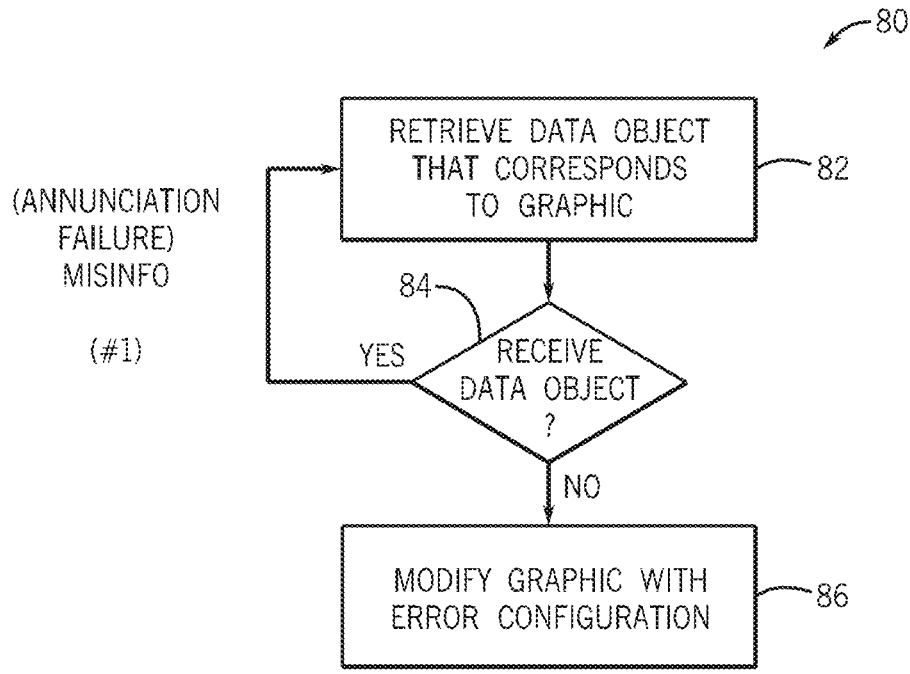

When determining whether a device element 18 displayed on the HMI 26 should be modified or should include the error icon 68, the HMI 26 may employ a method 80 as provided in FIG. 8. That is, at block 82, the HMI 26 may retrieve a data object linked to a device element 18 displayed on the HMI 26 from a memory location. The memory location may be specified in the metadata 47 of the device element 18.

At block 84, the HMI 26 may determine whether the data object requested at block 82 was indeed retrieved. The data object may not be retrieved when there is the specified memory location is empty, when a connection to the memory location is unavailable, and the like. In some embodiments, the HMI 26 may verify that the retrieved data object matches an expected data type, is within an expected range of values, has the correct units, and so forth.

If the HMI 26 determines that the data object was retrieved, the HMI 26 may return to block 82. However, if the data object was not retrieved at block 82, the HMI 26 may proceed to block 86 and modify the displayed graphics representing the device element 18 that has the missing data object. That is, the HMI 26 may modify the displayed graphics by changing how the outline of the device element 18 is depicted, by placing the error icon 68 over the graphics representing the device element 18, or both. In addition to modifying the displayed graphics when a data object has not been retrieved, in certain embodiments, the HMI 26 may also modify the displayed graphics for the device element 18 if the HMI 26 determines that a system fault or an annunciation condition occurs.

The HMI 26 may perform method 80 for each device element 18 that is present on the HMI 26 including those device elements 18 that may not be displayed on a viewable region of the HMI screen 60. That is, the HMI screen 60 may display a portion of all of the images or device elements 18 that may be present on the HMI 26. As such, it would be beneficial for the HMI 26 to indicate on the HMI screen 60 that an error exists on one of the device elements 18 present on the HMI 26 but not displayed on the HMI screen 60. FIG.

9 illustrates a flow diagram of a method 90 for indicating that an error exists in a visualization not currently displayed on the HMI screen 60.

Figure 9:
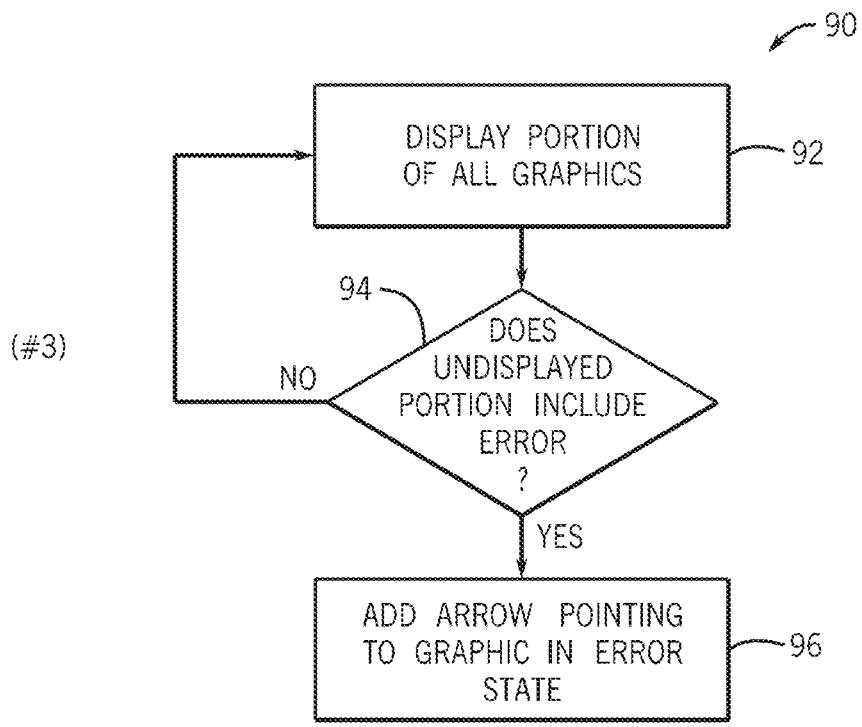
Figure 10:
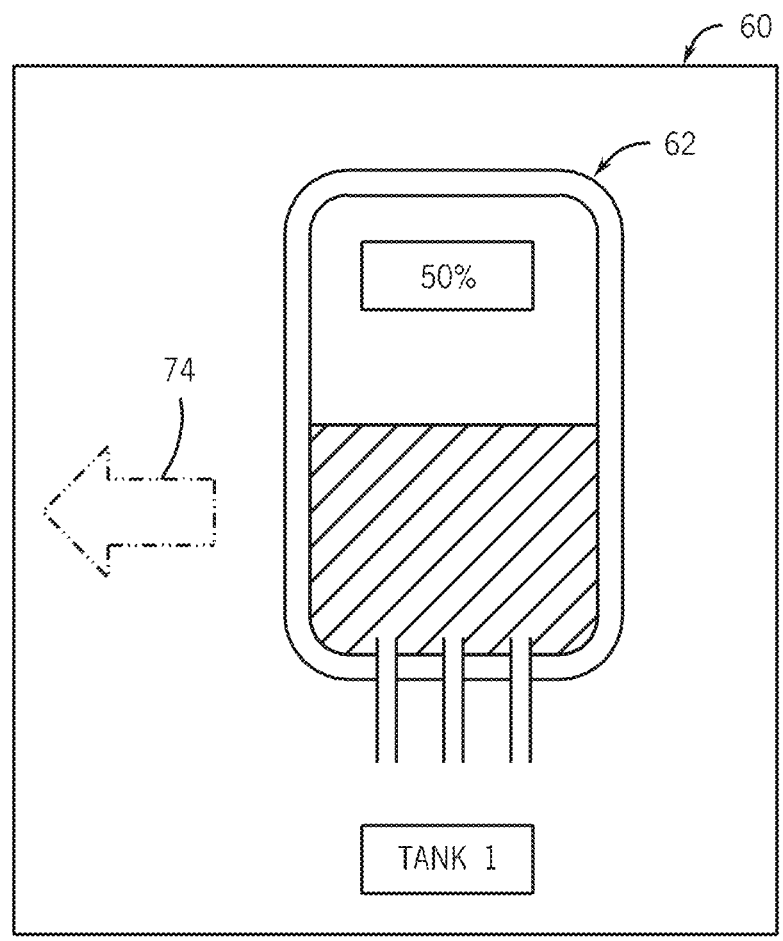
FIG. 10 is a flow diagram of a method for depicting errors in a visualization on the HMI screen, in accordance with an embodiment.

Referring to FIG. 9, at block 92, the HMI 26 may display a portion of all of the graphics for device elements 18 designed to be accessible via the HMI 26 on the HMI screen 60. The displayed portion of graphics may correspond to the location of a cursor or based on user input indicating a desired portion of the graphics to be displayed on the HMI screen 60, At block 94, the HMI 26 may determine whether any device element 18 or other graphics depicted in a non-displayed visualization of the HMI screen 60 has an error associated therewith. If the non-displayed visualization does indeed have an error associated with it, the HMI 26 may proceed to block 96 and add an image of an arrow on the canvas of the displayed visualization on the HMI screen 60 to indicate the location of the erroneous device element 18 with respect to the displayed visualization on the HMI screen. For instance, FIG. 10 illustrates an example of when the tank 62 is not in an error state. However, the HMI screen 60 includes an error arrow 74 that indicates the location of an erroneous device element 18 with respect to the viewable visualization on the HMI screen 60. As shown in FIG. 10, the error arrow 74 may have an outline that is consistent with the modified outline as described above to designate a graphic as being in an error state.

If, however, the HMI 26 determines at block 94 that the non-displayed visualization does not include any errors, the HMI 26 may return to block 92. At block 92, the HMI 26 may continue displaying the portion of the graphics designed to be viewed or accessible via the HMI screen 60.

Figure 11:
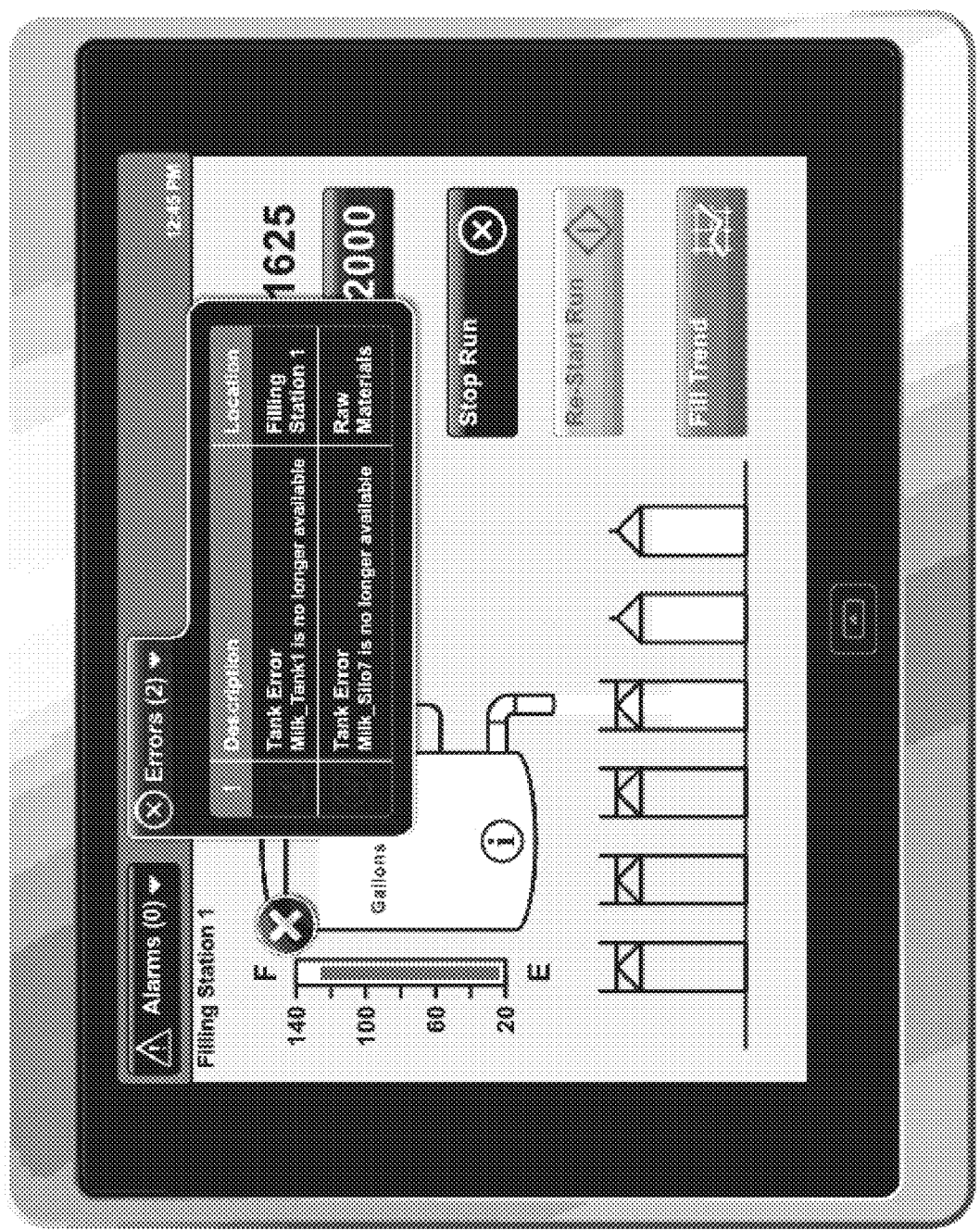
FIG. 11 is a flow diagram of a method for indicating locations of errors that are not in a currently viewable region of a visualization on the HMI screen, in accordance with an embodiment.

In addition to adding an error arrow 74 or the error icon 68 to the HMI screen 60 or in lieu of adding the error arrow 74 or the error icon 68, the HMI 26 may provide a drop down list graphic that may list all of the errors that may be associated with the HMI screen 60, other screens, or any applications being executed by the HMI 26 or another device. For instance, FIG. 11 FIG. 4 provides an example of a screen shot of an HMI display that may provide the drop down list graphic. In this manner, if the HMI 26 determines at block 94 that a non-displayed visualization does include an errors, the HMI 26 may add the error that corresponds to the non-displayed visualization to the drop down list. Further, the drop down list may also receive an input such that the HMI screen 60 may quickly navigate to the erroneous device element 18.

In certain embodiments, errors may arise and be resolved before the HMI user has had an opportunity to see the corresponding error icons 68. Although the errors may no longer be active or present in the industrial automation system, it may still be beneficial for the HMI user to know of the errors that occurred within the HMI 26 to ensure the quality of various aspects of the industrial automation system. As such, FIG. 12 illustrates a method 100 for removing the error icon 68 from the HMI screen in accordance with the embodiments described herein.

Figure 12:
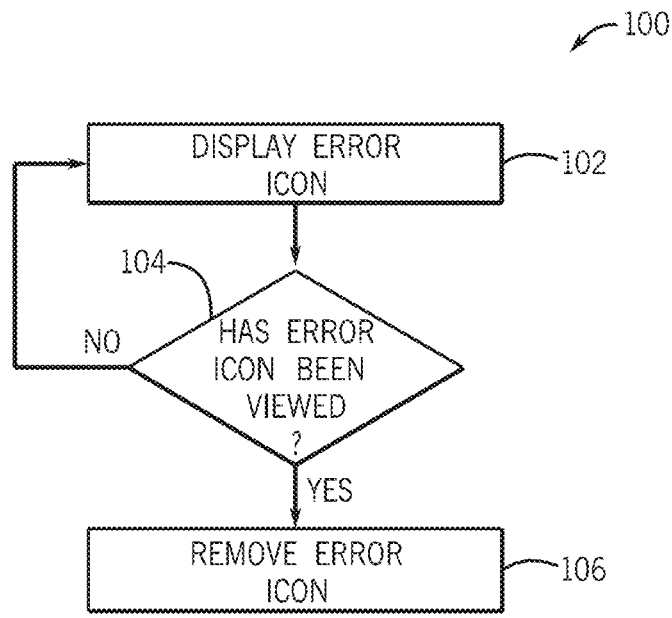
FIG. 12 is a flow diagram of a method for managing the display of errors in a visualization on the HMI screen, in accordance with an embodiment.

Referring now to FIG. 12, at block 102, the HMI 26 may receive an indication that an error is present with regard to the device element 18. Accordingly, the HMI 26 may display the error icon 68 on top of or over the erroneous device element 18 as depicted in the HMI screen 60.

At block 104, the HMI 26 may determine whether the error icon 68 has been viewed. As mentioned above, the error icon 68 may receive an input from the HMI user such that it may display additional information regarding the nature of the error. In one embodiment, if the HMI 26 receives an input at the error icon 68, the HMI 26 may determine that the error icon 68 has indeed been viewed. Further, if the HMI 26 does not receive an input at the error icon 68, the HMI 26 may determine that the error icon 68 has not been viewed. In another embodiment, the HMI 26 may determine that the error icon 68 has been viewed if the HMI user navigates the HMI screen 60 towards the error icon 68 or if the HMI user performs some function on the HMI 26 that may suggest that he likely viewed the error icon 68. For instance, if the HMI user accesses a memory location that is related to the error icon 68, the HMI 26 may determine that the error icon 68 has been viewed.

If, at block 104, the HMI 26 determines that the error icon 68 has not been viewed, the HMI 26 may return to block 102 and continue to display the error icon 68. If, however, the HMI 26 determines that the error icon 68 has been viewed, the HMI 26 may proceed to block 106.

At block 106, the HMI 26 may remove the error icon 68 from the HMI screen 60. However, unless the error associated with the error icon 68 has been resolved, the HMI 26 may continue to depict the erroneous device element 18 that corresponds to the error icon 68 with a modified graphic as described above. In this way, the error icon 68 may be removed from the HMI screen such that the HMI user may access other components depicted on the HMI screen to resolve the problem related to the error icon 68 or perform another operation that may not be related to the error icon 68. If the HMI user performs another operation and does not resolve the problem for the error icon 68, the modified graphic of the erroneous device element 18 may still provide the HMI user an indication that a problem exists within the HMI 26. However, by removing the error icon 68 after it has been viewed, the HMI 26 may be able to use more of the HMI screen space to depict the various graphics that may be used to interface with the HMI 26 and potentially resolve the error associated with the error icon 68.

In some cases, numerous error icons 68 may be generated on the HMI screen 60 due to the same underlying error. Here, the HMI 26 may remove each of the error icons 68 that were generated based on the same underlying error after some number (e.g., one) of the related error icons 68 has been viewed.

After removing the viewed error icons 68, the HMI 26 may wait some amount of time before reproducing the error icons 68. In this way, even though the error condition may still be present, the HMI user may not be bothered by continuously dismissing the reproduced error icon 68 while trying to resolve issues that may have caused the error icon 68 to appear. In certain embodiments, in addition to or in lieu of waiting for some time to expire, the HMI 26 may reproduce the error icon 68 when a state of the error icon 68 or the corresponding device element 18 has changed.

In any case, when interacting with the error icon 68, the HMI user may retrieve additional information with regard to the erroneous device element 18. As mentioned above, the error icon 68 may receive an input such that the HMI 26 may display the error window 70 to provide in context detail of the particular error that corresponds to the device element 18. For example, FIG. 13 illustrates a detailed view 110 of an example error window 70 that may provide the HMI user with additional information regarding the error related to the erroneous device element 18.

Figure 13:
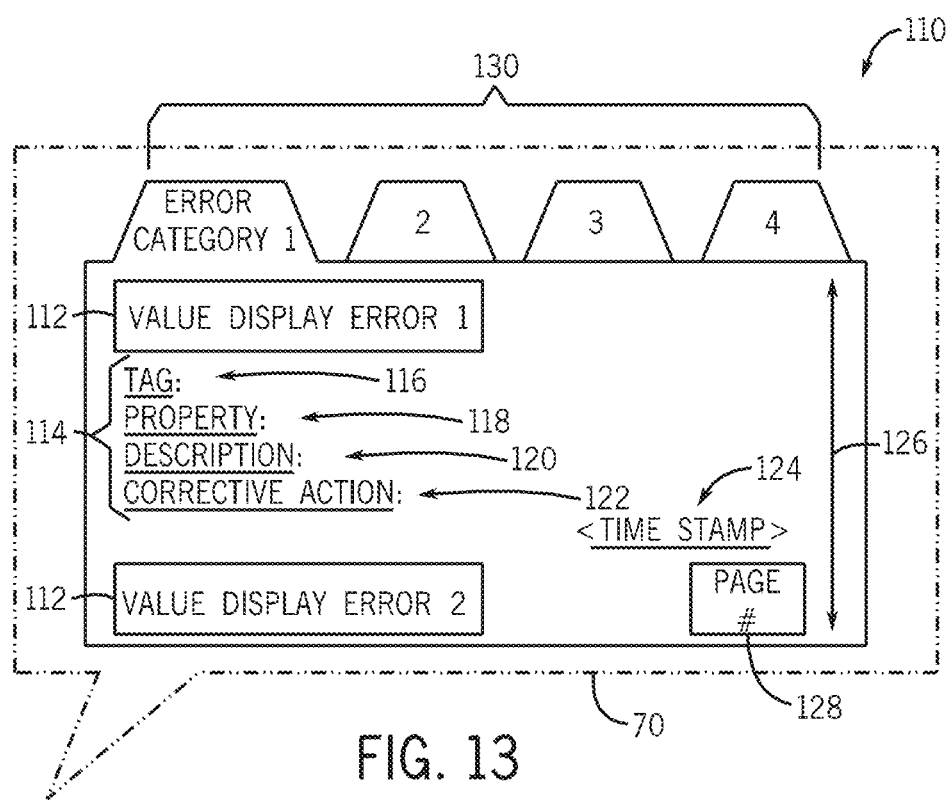
FIG. 13 is a diagram of an error window depicted in a visualization on the HMI screen, in accordance with an embodiment.

Referring to FIG. 13, the error window 70 may include an error title 112 that may provide a brief description of the error associated with the device element 18. In addition to the title, the error window 70 may include additional error data fields 114 (e.g., tag, property, description) that may provide in context detail with regard to the error. Each of these data fields may retrieve data from different memory locations as specified by the corresponding metadata 47. In certain embodiments, a tag field 116 in the error window 70 may specify a particular software component (e.g., file, memory address) that may be corrupt, invalid, or in any state of error. A property field 118 in the error window 70 may indicate a data type that the HMI 26 may expect to receive. As such, the tag field 116 and the property field 118 may provide information that may enable an experienced HMI user to quickly identify whether the error is related to software components (e.g., control and monitoring software framework 10) that correspond to the erroneous device elements 14 or related to hardware components (e.g., physical devices) that correspond to the erroneous device elements 14. Furthermore, the data fields 114 may include a description field 120 that may provide a detailed description of the error such that a person who may not be an experienced HMI user may still understand the nature of the error. In some embodiments, the data fields 114 may include a corrective action field 122 that may propose an action for the HMI user to perform to correct or resolve the issue causing the error. Accordingly, the data fields 114 may assist the HMI user to trouble shoot or resolve errors more efficiently.

The error window 70 may also include a time stamp 124 that may indicate a time at which the error icon 68 may have first appeared. In one embodiment, the time stamp 124 may be configured to display the amount of time that has passed since the error occurred. As such, the HMI user may be aware of when the error occurred and when the last valid reading of the device element 18 may have occurred (e.g., 3 minutes ago, 5 hours ago). Accordingly, the HMI user may avoid using stale data for analysis, thereby increasing the accuracy of the data acquired by the HMI user. In one embodiment, the errors may also be logged into an error history database with a corresponding timestamp.

In some embodiments, an erroneous device element 18 may have a number of errors associated therewith. In this case, the error window 70 may display each of the errors that are associated with the erroneous device element 18. To minimize the amount of the HMI screen 60 used to display each error, each error may be displayed within a scrollable error window 70. As such, the HMI user may interact with a scroll bar 126 to view each error associated with the erroneous device element 18. By presenting each error using a scrollable error window, the HMI user will avoid clicking or interacting with numerous error icons 68 for all of the errors associated with the same device element 18, thereby making it easier for the HMI user to view each of the errors.

In another embodiment, instead of the scroll bar 126 or in combination with the scroll bar 126, the error window 70 may include a page number field 128 that may provide the information in the error window 70 via a pagination view. That is, the HMI 26 may portray information in the error window 70 using a number of page views to minimize the amount of HMI screen space used for the error window 70. In one embodiment, the HMI user may interact with the page number field 128 to quickly navigate through different pages.

Additionally, the error window 70 may display errors that are related in a category view such that related errors may be grouped into categories and displayed with respect to their categories. For instance, the error window 70 may depict error categories as tabs 128 within the error window 70. Although the error window 70 has been described as displaying categories of related errors as tabs 130, in some embodiments, the categories may be displayed using cascading error window and the like. Moreover, the error window 70 may not include any tabs 130. Instead, all of the errors related to the device element 18 may be depicted in one long list in the error window 70 that may be viewable using the scroll bar 126.

Figure 14:
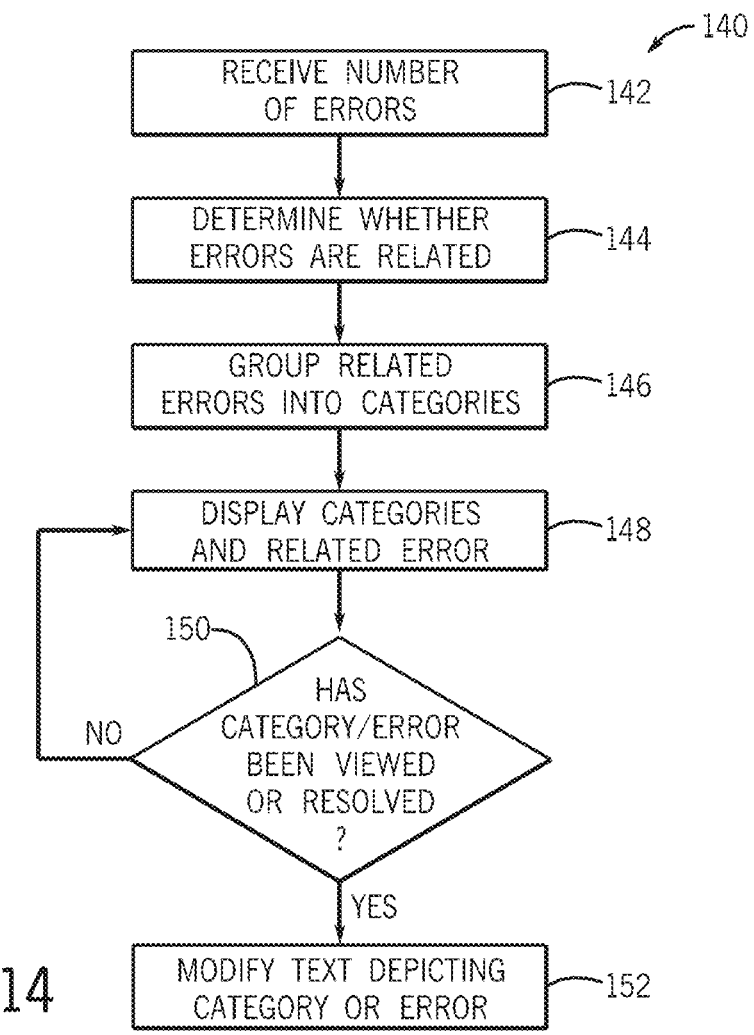
FIG. 14 is a flow diagram of a method for managing the display of errors in a visualization on the HMI screen, in accordance with an embodiment.

Keeping the foregoing in mind, FIG. 14 illustrates a flow diagram of a method 140 that the HMI 26 may employ to categorize and present related errors within the error window 70. At block 142, the HMI 26 may receive a number of errors related to a device element 18 depicted on the HMI 26. By way of example, the number of errors may be due to the fact that a network connection to a memory location that corresponds to the device element 18 is no longer available. Although the loss of the network connection may be the root cause of all of the errors, the HMI 26 may generate various other errors (i.e., chained errors). For instance, since the memory location for the device element 18 may not be available, a data field for the device element 18 may indicate a zero value, which may cause an annunciation condition to be generated. As such, the HMI 26 may generate an error related to the loss of network communication and an error related to the annunciation condition.

At block 144, the HMI 26 may analyze each error received at block 142 and determine whether any of the errors are related. Related errors may have a similar property such as an error type, similar expected values, and the like.

At block 146, the HMI 26 may group the related errors together into categories such that each related error may be displayed together within the error window 70. The categories may be used to broadly classify the related errors as a type of error (e.g., network, system fault, annunciation). In certain embodiments, the HMI 26 may group chained errors into a category.

At block 148, the HMI 26 may display the categories generated at block 144 on the error window 70. As mentioned above, the categories of errors may be displayed within the error window 70 as tabs, cascaded windows, or the like. In one embodiment, information regarding each related error may be viewed by the HMI user by scrolling down the error window 70. By displaying the related errors together, the HMI 26 may convey to the HMI user a better indication of how many different (root) problems may exist.

At block 150, the HMI 26 may determine whether each category and/or error has been viewed or resolved. As each category and/or error listed in the error window 70 has been viewed or resolved, the HMI 26 may, at block 152, modify the text depicting the category and/or error. For instance, the HMI 26 may add a visual strike through the text depicting the category and/or error after the category and/or text has been displayed for some time, after the HMI user provides an input or interacts with the category and/or error, after the error condition is no longer present, and the like. In this way, as errors become resolved during troubleshooting or diagnostic processes, information related to the error may still be viewable by the HMI user to perform any additional analysis.

Figure 15:
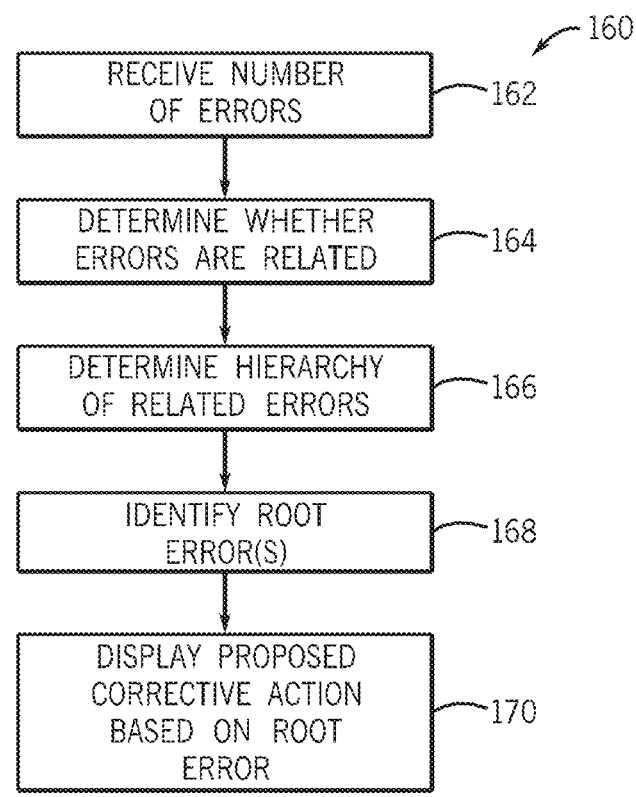
FIG. 15 is a flow diagram of a method for managing the display of proposed corrective actions in a visualization on the HMI screen, in accordance with an embodiment.

In addition to categorizing related errors, the HMI 26 may identify a root error or cause of the related errors and propose a corrective action to resolve the root errors, thereby resolving all of the related errors. FIG. 15 illustrates a method 160 for determining the root error of related errors in accordance with an embodiment of the methods described herein. Like method 140, method 160 may begin by receiving a number of errors related to a device element 18 depicted on the HMI 26 (block 162) and by determining whether any of the received errors are related (block 164). At this point, the HMI 26 may determine that errors are related if they directly or indirectly cause each other to be generated such as when a single error causes a cascading number of errors (i.e., chained errors) to be generated throughout the HMI 26. For instance, a loss of network connection error may produce a number of individual errors (i.e., chained errors) related to missing data objects that were previously accessible via the network connection.

At block 166, the HMI 26 may determine the hierarchy of the related errors. In one embodiment, each device element 18 may be designed to receive information from certain data objects, annunciate when certain conditions arise, and so forth. As such, the HMI 26 may use the design of the device element 18 to determine the hierarchy of an error related to the device element 18. The hierarchy may place the error in context with its causal/effectual relationship with other errors related to itself or its device element 18.

At block 168, the HMI 26 may identify the root error or root errors of the related errors identified at block 164. The root error(s) may be determined by analyzing the hierarchy of the related errors. As such, the HMI 26 may trace the chained errors to the root error or root cause of all of the chained errors. If the HMI 26 identifies the root error(s), the HMI 26 may then proceed to block 170.

At block 170, the HMI 26 may analyze the root error(s) and identify a proposed corrective action or multiple corrective actions to resolve the root error(s) or the cause(s) of the root error(s). Accordingly, the HMI 26 may display the proposed corrective action(s) in the corrective action field 122 of the error window 70. An example of a root error that may cause a number of related errors may include a lost network connection. In this case, each error caused by the lost network connection may be analyzed to determine the hierarchy of all of the related errors. In one embodiment, the metadata that corresponds to each error may indicate the cause of that particular data. The HMI 26 may analyze all of the causes that corresponds to all of the related errors and trace the root error to the lost network connection. As a result, the HMI 26 may propose a corrective action of checking the network connection, reestablishing a network connection, and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a human machine interface (HMI) configured to provide visualizations of one or more device elements that correspond to one or more components in an industrial automation system on an HMI screen, wherein the HMI comprises computer-executable instructions stored on a tangible machine-readable medium configured to:
   determine whether at least one of the device elements is associated with an error; and
   modify at least one graphic that corresponds to the at least one of the device elements when the one of the device elements is associated with the error by changing a pattern of a line that corresponds to an outline of the at least one graphic.

2. The system of claim 1, wherein the error comprises a configuration error, a system fault error, an annunciation condition, or any combination thereof.

3. The system of claim 1, wherein the computer-executable instructions are executable to modify the at least one graphic by changing a color of the line that corresponds to the outline of the at least one graphic.

4. The system of claim 1, wherein the computer-executable instructions are executable to modify the at least one graphic by stopping an animation of the at least one graphic when the one of the devices elements is associated with the error.

5. The system of claim 1, wherein the computer-executable instructions are executable to modify the at least one graphic based at least in part on an error state set defined by a user.

6. The system of claim 1, wherein the computer-executable instructions are executable to generate a drop-down list comprising an entry that corresponds to the one of the device elements when the one of the device elements is associated with the error, and wherein the entry is configured to navigate to the one of the device elements.

7. The system of claim 1, wherein the computer-executable instructions are executable to determine whether the at least one of the device elements comprises the error by:
   determining at least one memory location for at least one data object that corresponds to the at least one of the device elements; and
   determining that the at least one of the device elements comprises the error when the at least one data object cannot be retrieved from the at least one memory location.

8. A method for providing a visualization of one or more errors for one or more components in an industrial automation system, comprising:
   receiving, using a human machine interface (HMI), an indication that one or more device elements that correspond to the one or more components is associated with at least one error;
   modifying at least one graphic that corresponds to the one or more device elements associated with the at least one error; and
   generating at least one error icon adjacent to the at least one graphic, wherein the at least one error icon is configured to receive an input that causes information in context with the at least one error to be displayed within a portion of a screen of the HMI.

9. The method of claim 8, wherein generating the at least one error icon comprises:
   determining at least one type of error that corresponds to the at least one error icon, wherein the at least one type of error comprises a configuration error, a system default, or an annunciation condition; and
   generating at least one image for the at least one error icon based at least in part on the at least one type of error that corresponds to the at least one error icon; and
   displaying the at least one image adjacent to the one or more device elements.

10. The method of claim 8, comprising generating at least one numeric count adjacent to the at least one error icon, wherein the at least one numeric count indicates a number of errors associated with the at least one device element.

11. The method of claim 8, comprising removing the at least one error icon after the at least one error icon has been viewed.

12. The method of claim 11, comprising regenerating the at least one error icon after an amount of time expires.

13. The method of claim 11, comprising regenerating the at least one error icon after the at least one error icon changes state.

14. The method of claim 8, comprising removing the at least one error icon after an error icon related to the at least one error icon has been viewed.

15. The method of claim 8, comprising displaying the information upon receiving the input, wherein the information comprises:
   at least one title summarizing the at least one error;
   at least one description of at least one error that corresponds to the at least one device element;
   at least one tag comprising at least one software component having an error, wherein the at least one software component corresponds to the at least one device element;
   at least one property comprising at least one data type that corresponds to the at least one device element;
   at least one corrective action for resolving the at least one error icon;
   at least one time stamp indicating a time at which the at least one error icon was generated; or
   any combination thereof.

16. The method of claim 15, wherein the at least one time stamp is configured to indicate at least one amount of time that has expired since the at least one error icon was generated.

17. The method of claim 15, wherein displaying the information comprises:
   displaying a first portion of the information in a portion of the screen, wherein a second portion of the information is displayed upon receiving a first input indicative of a request to scroll through the information;
   displaying the first portion of the information in the portion of the screen as a first page of a pagination view, wherein the second portion is displayed upon receiving a second input indicative of a request to cause a different page of the information to be displayed;
   or any combination thereof.

18. A tangible, non-transitory, computer-readable medium comprising machine-readable instructions to:
   receive a plurality of errors that corresponds to a plurality of device elements for depiction in visualizations on a screen of a human machine interface (HMI), wherein the plurality of device elements correspond to a plurality of components in an industrial automation system, and wherein the HMI is configured to monitor and control the plurality of components;
   identify one or more subsets of the plurality of errors, wherein each of the one or more subsets comprises at least two of the plurality of errors and wherein the at least two of the plurality of errors are related;
   classify the one or more subsets as one or more categories of errors; and
   display an indication of the categories of errors.

19. The tangible, non-transitory, computer-readable medium of claim 18, wherein the at least two of the plurality of errors are related when the at least two of the plurality of errors comprise the same error type or are generated in response to a same error.

20. The tangible, non-transitory, computer-readable medium of claim 18, comprising machine-readable instructions to:
   determine whether the categories of errors have been viewed; and
   modifying text associated with the categories of errors when the categories of errors have been viewed.

21. The tangible, non-transitory, computer-readable medium of claim 18, wherein the machine-readable instructions to modify the text comprises instructions to strike through the text.

22. The tangible, non-transitory, computer-readable medium of claim 18, comprising machine-readable instructions to:
   identify at least one root error that corresponds to each error in each of the one or more subsets of the plurality of errors;
   determine at least one corrective action for the at least one root error, wherein the at least one corrective action is configured to resolve the at least one root cause; and
   display an indication of the at least one corrective action.

23. The tangible, non-transitory, computer-readable medium of claim 22, wherein the machine-readable instructions are executable to determine the at least one corrective action by:
   determining a hierarchy for each error in each of the one or more subsets of the plurality of errors; and
   identifying at least one error in each of the one or more subsets that caused the remaining errors in each portion.

* * * * *